United States Patent
Skaff et al.

(10) Patent No.: US 8,810,658 B2
(45) Date of Patent: Aug. 19, 2014

(54) ESTIMATING A VISIBLE VECTOR REPRESENTATION FOR PIXELS IN AN INFRARED IMAGE

(75) Inventors: Sandra Skaff, Rochester, NY (US); Raja Bala, Pittsford, NY (US); Lalit Keshav Mestha, Fairport, NY (US); Beilei Xu, Penfield, NY (US)

(73) Assignee: Xerox Corporation, Norwalk, CT (US)

( * ) Notice: Subject to any disclaimer, the term of this patent is extended or adjusted under 35 U.S.C. 154(b) by 336 days.

(21) Appl. No.: 13/364,835

(22) Filed: Feb. 2, 2012

(65) Prior Publication Data

US 2013/0201342 A1 Aug. 8, 2013

(51) Int. Cl.
*H04N 5/33* (2006.01)

(52) U.S. Cl.
USPC .......... 348/164; 348/143; 348/148; 348/169; 382/103; 382/154; 382/164; 382/169; 382/191; 382/274; 600/310; 600/475; 600/477

(58) Field of Classification Search
CPC ......... H04N 5/33; H04N 5/332; H04N 9/045; H04N 9/43
USPC .......... 348/164, 143, 148, 169; 382/103, 154, 382/164, 169, 191, 274; 600/310, 475, 477
See application file for complete search history.

(56) References Cited

U.S. PATENT DOCUMENTS

| | | | |
|---|---|---|---|
| 2006/0102843 A1* | 5/2006 | Bazakos et al. | 250/339.05 |
| 2006/0177137 A1* | 8/2006 | Friedhoff | 382/199 |
| 2009/0163369 A1* | 6/2009 | Treado et al. | 506/8 |
| 2011/0216196 A1* | 9/2011 | Ishi et al. | 348/148 |

OTHER PUBLICATIONS

Gu et al. "Colorizing Single-Band Thermal Night Vision Images". Proceedings of the 2010 IEEE 17th International Conference on Image Processing, pp. 301-304.*
Hogervorst et al. "Presenting nighttime imagery in daytime colours". 2008 11th International Conference on Information Fusion, pp. 1-8.*
Xiaojing Gu, et al., "Colorizing Single-Band Thermal Night Vision Images", Proceedings of 2010 IEEE 17th International Conference on Image Processing, Sep. 26-29, 2010, Hong Kong, pp. 301-304.

* cited by examiner

*Primary Examiner* — Christopher S Kelley
*Assistant Examiner* — Zhihan Zhou
(74) *Attorney, Agent, or Firm* — Philip E. Blair; Fleit Gibbons Gutman Bongini & Bianco P.L.

(57) ABSTRACT

What is disclosed is a system and method for estimating color for pixels in an infrared image. In one embodiment, an infrared image is received which has been captured using a N-band infrared imaging system comprising a multi-spectral camera or a hyperspectral camera. The IR image is composed of an array of pixels with N intensity values having been collected for each pixel in the image. Then, for each pixel of interest, a search metric is used to search a database of vector samples to identify a visible-IR set which is closest to the intensity values of the IR band vector collected for the pixel. A visible vector representation is then estimated for the pixel based upon the visible portion corresponding to the closest visible-IR set. Thereafter, color coordinates for this pixel are computed from the visible vector. The method repeats for all pixels of interest in the IR image.

23 Claims, 8 Drawing Sheets

ESTIMATING A VISIBLE VECTOR REPRESENTATION FOR PIXELS IN AN INFRARED IMAGE

TECHNICAL FIELD

The present invention is directed to system and method for estimating color of a pixel of an infrared image captured using either a multi-spectral or a hyperspectral infrared camera system.

BACKGROUND

Color images appear to the human eye as a combination of the additive primary colors of red, green, and blue. When added together in equal amounts, these colors form white light. Color images are generally more useful than black and white images as the human eye can discriminate many more shades of color than it can shades of grey. Light detectable by the human eye is only a small portion of the electromagnetic spectrum. The wavelength range represented by visible color is relatively small, from 0.4-0.7 microns. The human eye is biologically optimized for the detection of visible light. Wavelengths above and below this range must be measured using specialized instruments capable of detecting electromagnetic radiation. The electromagnetic spectrum divides this energy into specific regions that can be used by different remote sensing instruments. Infrared light is used in many diverse industrial, scientific, and medical applications. For example, night-vision devices using infrared illumination allow people to be observed without the observer being detected. However, infrared images captured by such specialized cameras lack color. Therefore, it is desirable to determine the color of pixels in an infrared image.

BRIEF SUMMARY

What is disclosed is a system and method for estimating colors of pixels from infrared (IR) for multi/hyperspectral image data. The present invention identifies color portions of input spectra for which only the infrared portions are available by retrieving from a database the sample that is closest to an input sample in the IR range, and extracting the visible portion of the database sample spectrum as the estimate of the color of the input sample. Performance tests demonstrate that the teachings hereof provide good color estimation of a given pixel via a comparison of the captured data to the reference database in 35 or less IR bands. The present method finds its uses in a wide variety of applications such as, for example, image recognition, surveillance, security, transportation, and the like, where it is highly desirable to obtain accurate color images from infrared images captured using an infrared imaging system.

One embodiment of the present method for estimating color for pixels in an infrared image involves the following. First, an infrared image is received which has been captured using a N-band infrared imaging system comprising a multi-spectral camera or a hyperspectral camera. The IR image is composed of an array of pixels with N intensity values having been collected for each pixel in the image. Then, for each pixel of interest, a search metric is used to search a database of vector samples to identify a visible-IR set which is closest to the intensity values of the IR band vector collected for the pixel. This database is determined apriori with a representative material set. A visible vector representation is then estimated for the pixel based upon the visible portion corresponding to the closest visible-IR set. Thereafter, color coordinates for this pixel are computed from the visible vector. The database hereof contains both visible-IR sets and IR sets with each of the visible-IR sets comprising a visible portion with an associated vector of a spectrum which has been discretized into wavelength intervals in the visible range, and an IR portion with an associated vector of a spectrum which has been discretized into wavelength intervals in the IR. Each of the IR sets in the database comprises a vector of spectra discretized into wavelength intervals in the IR range. Both the visible and IR vectors comprise spectra which can be continuous or discretized into intervals in the visible and IR wavelength ranges. Various embodiments are disclosed.

Many features and advantages of the above-described method will become readily apparent from the following detailed description and accompanying drawings.

BRIEF DESCRIPTION OF THE DRAWINGS

The foregoing and other features and advantages of the subject matter disclosed herein will be made apparent from the following detailed description taken in conjunction with the accompanying drawings, in which.

DETAILED DESCRIPTION

What is disclosed is a system and method for estimating color of pixels from infrared (IR) for multi/hyperspectral image data.

Non-Limiting Definitions

An "image", as used herein, refers to a spatial pattern of light of known colors of the light spectrum which are visible to the human eye. When an image is provided to a memory or storage device, the pixels are stored in any of a plurality of formats such as BMP, JPEG, GIF, TIFF, or other formats employed for storing image data. When captured, the image comprises a plurality of pixels.

A "pixel" is the smallest addressable element in an image. Each pixel has its own address. Pixels are normally arranged in a grid. The intensity of each pixel is variable and depends on the characteristics and sensitivity of the camera device being used to capture or measure that pixel. The resolution for a camera depends on the size of the pixel and the number of pixels in the camera sensor. For a given sensor size, smaller pixels mean more of them will fit into the captured image, thus giving it better definition.

A "pixel of interest" is a pixel in an infrared image which is intended to be processed according to the methods disclosed herein. One or more pixels of interest in an IR image may be manually selected by a user using, for instance, the user interface of a computer workstation, or may be selected by an algorithm programmed to process pixels in an image according to a pre-determined or user-selected criteria.

An "infrared camera" or thermographic camera is a device that forms an image using infrared radiation, similar to a camera that forms an image using visible light. Instead of the 450-750 nm range of a visible light camera, the infrared camera operates in wavelengths as long as 14 μm. Infrared light lies between the visible and microwave portions of the electromagnetic spectrum. The infrared spectrum can be divided into several wavelength bands based on the response of the detectors; Very Long Wave Infrared (VLWIR) range from 12 μm to 30 μm; Long Wave Infrared (LWIR) range from 7 μm to 14 μm; Mid Wave Infrared (MWIR) range from 3 μm to 5 μm; Short Wave Infrared (SWIR) range of 1.0 μm to 3 μm and the Near Infrared (NIR) range of 0.7 μm to 1.0 μm. Since the reflective IR band is within the range of 0.7 μm to 2.5 μm, the scene may need illumination to create reflected energy. In the daytime, illumination may be unnecessary because sufficient IR radiation is provided by sunlight. Above the infrared is the visible spectrum which is the range in which the sun emits radiation in a spectrum that the human eye is sensitive to. A rainbow shows the visible part of the EM spectrum. Infrared is just beyond the red side of the rainbow with ultraviolet appearing just beyond the violet end. Electromagnetic radiation with a wavelength between 380 nm and 760 nm is perceived by the human eye as visible light.

An "infrared image" is an IR image captured of a subject of interest using an infrared imaging system. A fully-populated IR image consists of pixels each having an associated IR band vector comprising the N intensity values (IR band vector) collected for that pixel at each of the N desired spectral wavelength bands of interest.

A "N-band infrared imaging system" is an apparatus comprising an IR illuminator and an IR detector designed to capture IR light reflected from a target object, separate it into its N component wavelength bands, and output an IR image of the target. In various embodiments hereof, the infrared illumination system comprises a pulsed illuminator source or a continuous illuminator source, with both sources illuminating in the entire infrared wavelength band of interest.

A "hyperspectral camera" is a camera with hyperspectral sensors which collect information as a set of images with each image representing a range of the electromagnetic spectrum. The captured images are then combined to form a three-dimensional hyperspectral data cube for processing and analysis. The precision of these sensors is typically measured in spectral resolution which is the width of each band of the spectrum that is captured. Hyperspectral deals with imaging narrow spectral bands over a continuous spectral range, and produce the spectra of all pixels in the scene. A primary advantage to hyperspectral imaging is that, because an entire spectrum is acquired at each point, the operator needs no prior knowledge of the sample and post-processing allows all available information from the dataset to be mined. Hyperspectral imaging can also take advantage of the spatial relationships among the different spectra in a neighborhood thereby allowing more elaborate spectral-spatial models for a more accurate segmentation and classification of the image.

A "multi-spectral camera" is a sensing device for capturing image data at specific frequencies across the electromagnetic spectrum. The wavelengths may be separated by filters or by instruments that are sensitive to particular wavelengths. Spectral imaging allows the extraction of information that the human eye failed to detect with its red, green and blue receptors. A multispectral sensor may have many bands covering the spectrum from the visible to the long wave infrared. Multispectral images do not produce the "spectrum" of an object easily.

A "search metric" is used to search the spectra database of vector samples such that a visible-IR set can be identified which has intensity values closest to the pixel's IR band vector. While the present method uses a nearest-neighbor lookup with a root mean square error metric to select a visible-IR sample that is closest to an input sample in the IR, other techniques such as a weighted distance interpolation can be used.

When the visible-IR sets and the pixel's intensity values in the IR band are narrowband spectra, then the search metric is given by:

$$x_{cIR} = \operatorname{argmin}_{cIR=1,\ldots,N_{cIR}} \sqrt{\frac{\sum_{i=1}^{N}(S_{IR}^{x_{cIR}}(\lambda_i) - S_{IR}^{x_{IR}}(\lambda_i))^2}{N}} \quad (1)$$

where N is the number of spectral bands of said imaging system, $N_{cIR}$ is the number of samples in said visible-IR set, $S_{IR}^{x_{cIR}}(\lambda_i)$ is the IR reflectance of sample $x_{cIR}$ from the visible-IR set at wavelength $\lambda_i$, and $S_{IR}^{x_{IR}}(\lambda_i)$ is the IR reflectance of sample $x_{IR}$ from the IR set at wavelength $\lambda_i$, with a visible portion of $x_{cIR}$ being assigned to sample $x_{IR}$.

When the IR portions of the visible-IR sets and the IR sets in the spectra database are spectral responses obtained for a set of IR filters with known spectral transmittances, then the search metric is given by:

$$x_{cIR} = \operatorname{argmin}_{cIR=1,\ldots,N_{cIR}} \sqrt{\frac{\sum_{i=1}^{N}(P_{IR_i}^{x_{cIR}} - P_{IR_i}^{x_{IR}})^2}{N}} \quad (2)$$

where N is a number of bands corresponding to said set of IR filters, $N_{cIR}$ is a number of samples in said visible-IR set, $P_{IR_i}^{x_{cIR}}$ is the IR response corresponding to the $i^{th}$ filter of sample x from said visible-IR set as given by:

$$P_{IR_i}^{x_{cIR}} = \Sigma_{\lambda=1}^{M} T_{IR_i}(\lambda) S_{IR}^{x_{IR}}(\lambda) E(\lambda) \quad (3)$$

where i is an index in said set of IR filters, $T_{IR_i}(\lambda)$ is the transmittance spectrum corresponding to an $i^{th}$ filter, said transmittance spectrum being characteristic of said filter and independent of sample x, $P_{IR_i}^{x_{IR}}$ is the IR response corresponding to the $i^{th}$ filter of sample x and computed in a same manner as $P_{IR_i}^{x_{cIR}}$, M is the dimension of the spectrum in the IR wavelength range, and $E(\lambda)$ is the illuminant spectrum.

A "visible vector representation" for a pixel is the color portion of a spectrum which can be projected onto spectral sensitivities of a given sensor in order to visualize that pixel in the visible range of color.

A visible vector representation of a pixel has two forms. In the instance where the color is given, the visible vector representation is defined by $P_k^x$ where x denotes the pixel and k denotes the sensor, or it can be defined by $S_{VIS}^x(\lambda)$. This relationship is given by:

$$P_k^x = \Sigma_{\lambda=1}^M S_{VIS}^x(\lambda) E(\lambda) R_k(\lambda) \qquad (4)$$

where k=1, 2, ..., p, where p is the number of sensors, M is the dimension of the spectrum in the visible wavelength range, $S_{VIS}^x(\lambda)$ is the reflectance of pixel x in the visible wavelength range, $E(\lambda)$ is the illuminant spectrum (assumed to be white), and $R_k(\lambda)$ is the relative wavelength sensitivity of the $k^{th}$ sensor. For purposes hereof, the number of sensors is three, i.e., red, green and blue.

"Computing color coordinates" for a given pixel means projecting onto the sensor spectral sensitivity curves of a given camera to obtain the corresponding color values in any dimension of a color space. Once all the pixels have corresponding color values obtained therefore, the new color image can be generated.

A "spectra database" refers to a database for which reflectances in the visible and IR wavelength ranges have been determined apriori with a representative material set with respect to an environment wherein the IR image was likely captured. As such, the present spectra database comprises a plurality of visible-IR sets and IR sets. Each of the visible-IR sets comprises a visible portion with an associated vector of a spectrum discretized into wavelength intervals in the visible range, and an IR portion with an associated vector of a spectrum discretized into wavelength intervals in the infrared range. As explained herein in greater detail, the present invention determines a visible vector representation, i.e., a color portion, of pixels in the image from the infrared portions of spectra. It should be appreciated that calculations for intensity values depend on the IR imaging system employed.

Flow Diagram of One Example Embodiment

Figure 1:
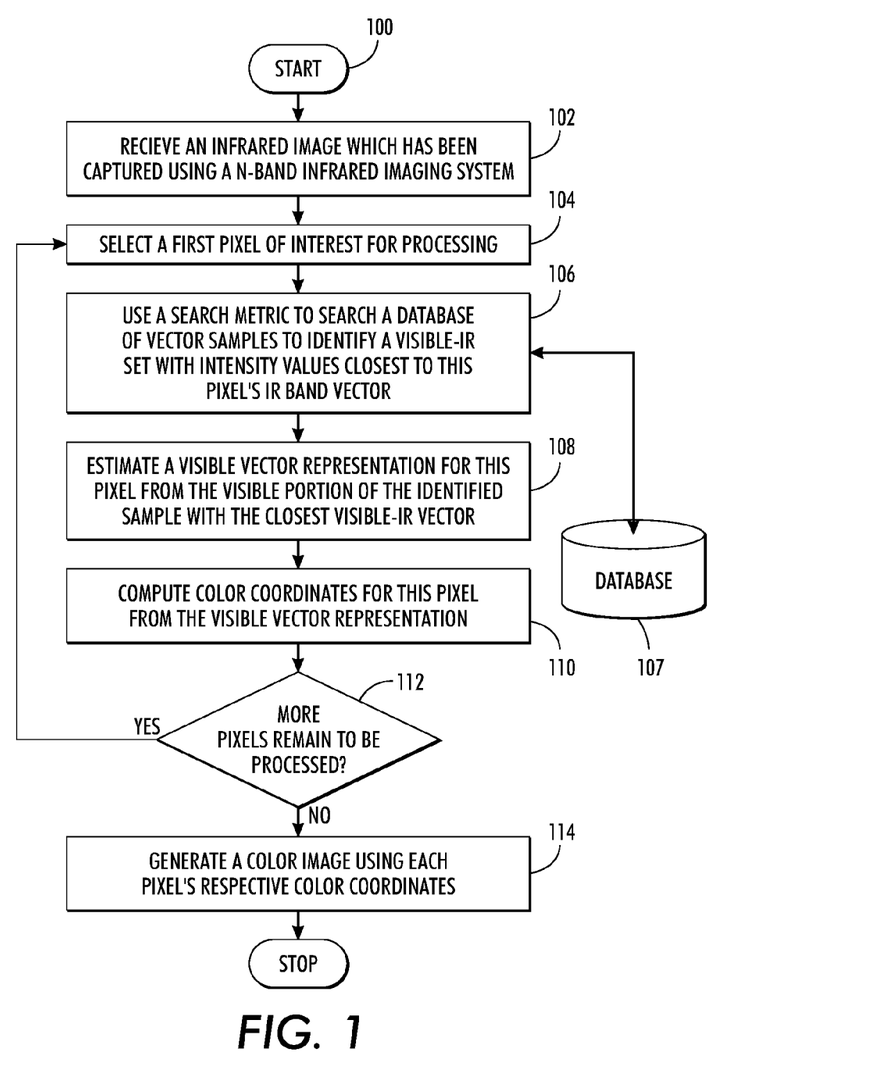
FIG. 1 is a flow diagram illustrating one example embodiment of the present method for estimating a visible vector representation for pixels in an infrared image.

Reference is now being made to the flow diagram of FIG. 1 which illustrates one example embodiment of the present method for estimating a visible vector representation for pixels in an infrared image. Flow processing begins at 100 and immediately proceeds to step 102.

At step 102, receive an infrared (IR) image for processing. The infrared image was captured using a N-band infrared imaging system. The IR image comprises a plurality of pixels with each pixel having an IR band vector of N intensity values collected for that pixel.

At step 104, select a first pixel of interest for processing.

At step 106, use a search metric to search a spectra database 107 of vector samples to identify a visible-IR set with intensity values closest to this pixel's IR band vector.

At step 108, estimate a visible vector representation for the pixel based upon the visible portion corresponding to the identified sample with the closest visible-IR vector. The estimated visible vector representation may be stored to a storage device or a memory or communicated to a remote device over a network.

At step 110, compute color coordinates for this pixel from the estimated visible vector representation. The color coordinates may be computed in real-time as the images are captured.

At step 112, a determination is made whether any more pixels in the received IR image remain to be processed. If so, then processing continues with respect to step 104 wherein a next pixel is selected for processing. Processing repeats in such a manner until there are no more pixels to be processed. Once color coordinates have been computed for each pixel of interest in the received IR image, at step 114, a color image is generated. Thereafter, in this embodiment, processing stops.

It should be appreciated that the flow diagrams hereof are illustrative. One or more of the operative steps illustrated in the flow diagram may be performed in a differing order. Other operations, for example, may be added, modified, enhanced, condensed, integrated, or consolidated. Such variations are intended to fall within the scope of the appended claims. All or portions of the flow diagrams may be implemented partially or fully in hardware in conjunction with machine executable instructions.

Example Functional Block Diagram

Figure 2:
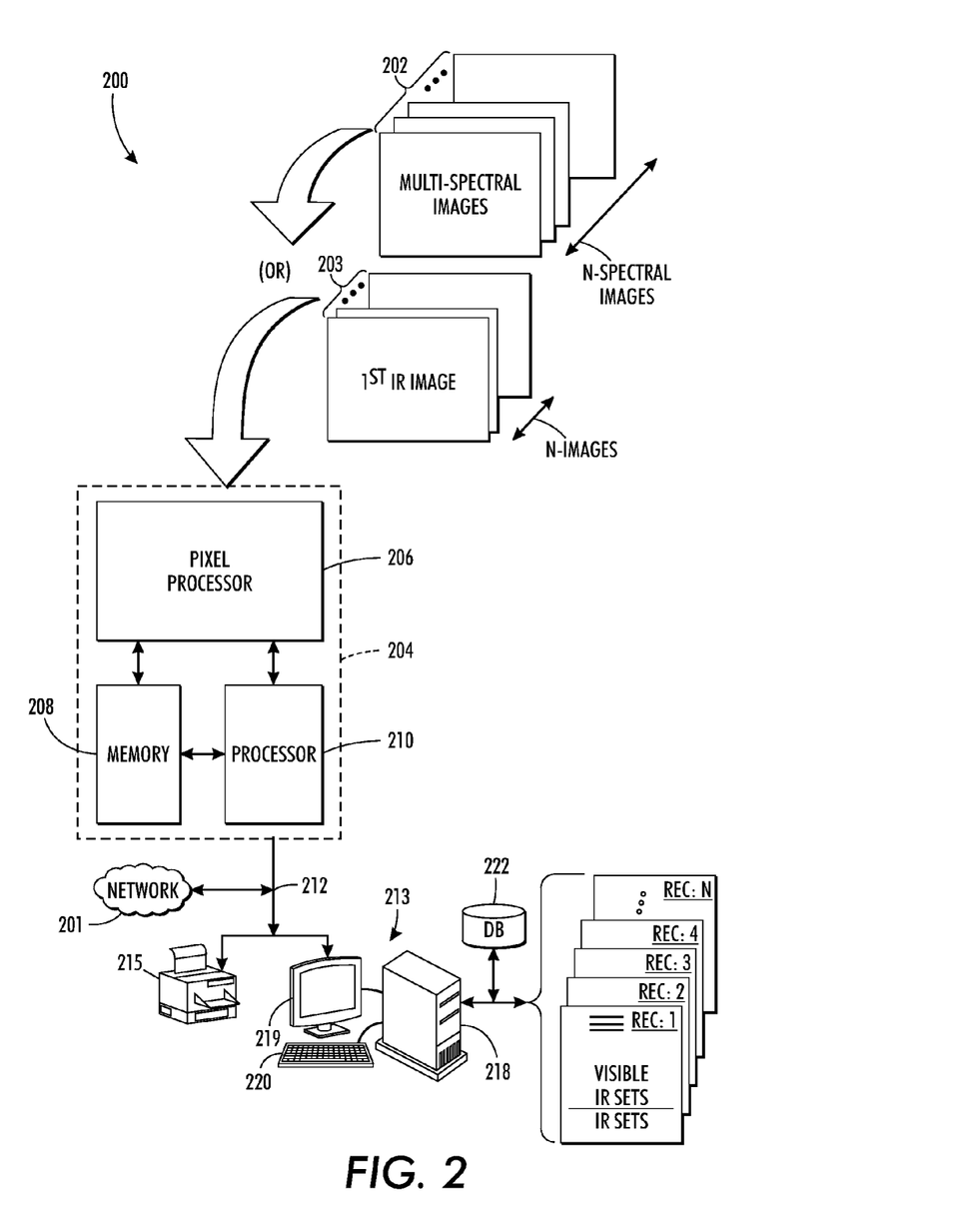
FIG. 2 shows a block diagram of one example image processing system 200 capable of implementing various aspects of the present method described with respect to the flow diagram of FIG. 2.

Reference is now being made to FIG. 2 which illustrates a block diagram of one example image processing system 200 capable of implementing various aspects of the present method described with respect to the flow diagram of FIG. 1.

The embodiment of FIG. 2 receives source IR image data comprising either a plurality of spectral planes 202 captured using a hyperspectral camera or one or more IR images 203 captured using a multispectral camera. Signal processing system 204 receives the source IR data into pixel processor 206 which performs the functionality described with respect to the flow diagram of FIG. 1. Memory 208 and CPU 210 facilitate the processing of the source IR data. The reconstructed color image 212 is communicated to a workstation 213. Some or all of the functionality performed by any of the modules of system 204 may be performed, in whole or in part, by workstation 213 or by a special purpose computer system. Computer 213 is shown comprising a computer case 218 housing a motherboard, CPU, memory, interface, storage device, and a network card. The computer system also includes display 219 such as a CRT or LCD. An alphanumeric keyboard 220 and a mouse (not shown) provide a mechanism for the computer to accept a user input. A computer readable medium (not shown) carries machine executable instructions for implementing various aspects of the present method. Computer system 213 implements spectra database 222 containing wherein various records containing visible IR sets and IR sets are stored. Although the database is shown as an external device, the database may be internal to computer case 218 mounted on the hard disk therein. Computer platform 213 may be a laptop, server, mainframe, or the like. Color printer 215 is in communication with workstation 213 for printing the colorized image 212.

Performance Results

The teachings hereof have been reduced to practice for a set of multi/hyperspectral image data obtained from the remote sensing community. The reflectances of the spectra in our database lie in the range 400-2490 nm. From the database of spectra, a random ten sets of spectra were selected, i.e., one of 500 samples for which we know the color and infrared portions of the spectra (referred to as visible-IR sets), and nine of 1000 samples each for which we know only the infrared portions of the spectra (referred to as IR sets). As it is highly unlikely due to practical reasons to have reflectances available at all wavelengths in the IR, we assume specific numbers of spectral bands in the IR. We also studied the effects of changing spectral bands as well as the selected combinations of these bands and show results of color estimation in two cases: (i) when the spectral bands considered are from the spectra themselves without filtering; (ii) when the spectral bands are determined given a set of filters and their transmittance spectra. Finally, given the same framework, we considered estimating the color of image regions which are treated as a set of pixels. Our experiments demonstrate that the smaller the number of bands considered in the IR across different combinations, the poorer the color estimates of the pixels and also the image regions for both case (i) and (ii).

Two cases were considered: (1) pixels or, equivalently, uniform patches representing the pixels and (2) image regions which are combinations of pixels.

Case 1 (Uniform Patches)

Figure 3:
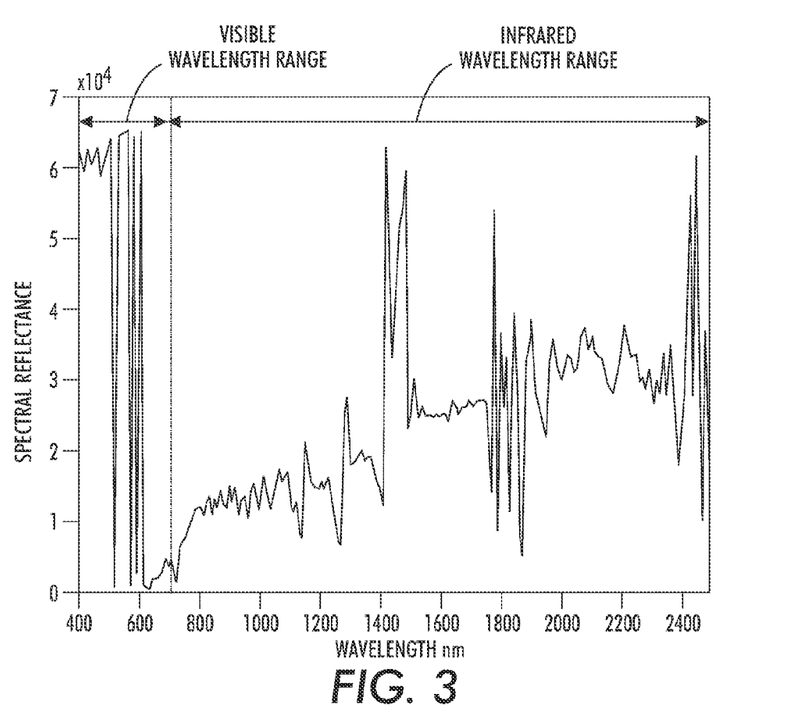
FIG. 3 shows the reflectance spectrum of one pixel in both the visible, 400-700 nm, and IR, 700-2490 nm, wavelength ranges.

We use a database of spectra obtained from a remote sensing image. Each spectrum has a given reflectance value between 400 nm and 700 nm, discretized into 10 nm intervals for the color portion. In the IR portion, each spectrum has a reflectance value in the range of 710 nm to 2490 mm (as in FIG. 3) discretized into 10 nm intervals. We selected at random from the database a set of 500 spectra which we refer to as the visible-IR set. From the remaining spectra, we selected at random nine databases of 1000 spectra each, which are referred to as the IR sets. The IR portions of spectra for both the color-IR and IR sets are obtained in two ways: (1) the IR bands are obtained from the spectra themselves; and (2) the IR bands are the responses to a set of IR filters for which we know the spectral transmittances. Each spectrum has 179 spectral bands in the IR wavelength range. Since this is a large number of bands, we selected 35, 17, 8, 5, 4, 3, 2, and 1 band from the 179 bands for each of the spectra in the color-IR and IR sets. Ideally, one would like to select all possible combinations for each of the number of bands. In the case of selecting 35 bands, the number of possible combinations is approximately $10^{37}$. Since this number is very large, we considered 20 possible combinations for each of the number of spectral bands as our objective was to demonstrate the feasibility of estimating color from infrared rather than finding the optimal combinations to do so. Note that the combinations considered in the 17 spectral band case are each a subset of those considered in the 35 spectral band case. The same applies to the other combinations. For each number of spectral bands considered, given a spectrum from the IR set, we found the visible-IR spectrum with a minimum root mean square error (RMSE) from the spectrum in the IR wavelength range. We conclude that the quality of color estimation decreases with the decrease of the number of spectral bands considered in the IR wavelength range, as expected. The search is summarized by the above-described Eq. (1).

Case 1(i)—When the Spectral Bands are from the Spectra Themselves without Filtering.

Figure 4A:
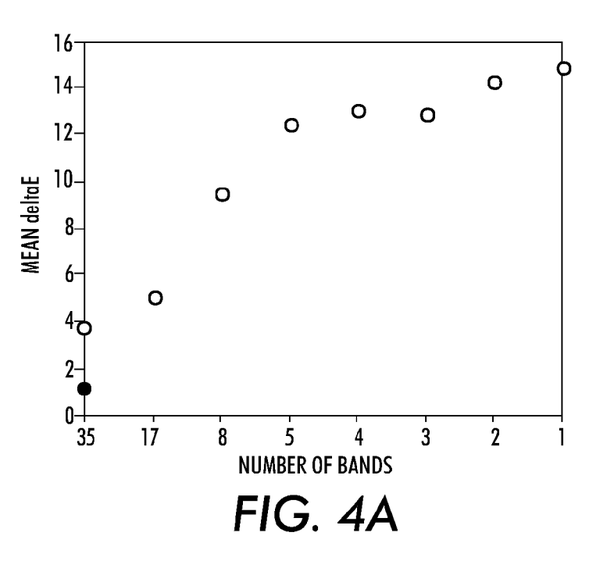
FIGS. 4A-B show the mean (FIG. 4A) and median (FIG. 4B) of the ΔE's taken between the actual and estimated Lab values over all 1000 samples for one IR set with the means and medians being evaluated for each number of spectral bands for each of 20 combinations considered as well as the corresponding numbers of spectral bands.
Figure 4B:
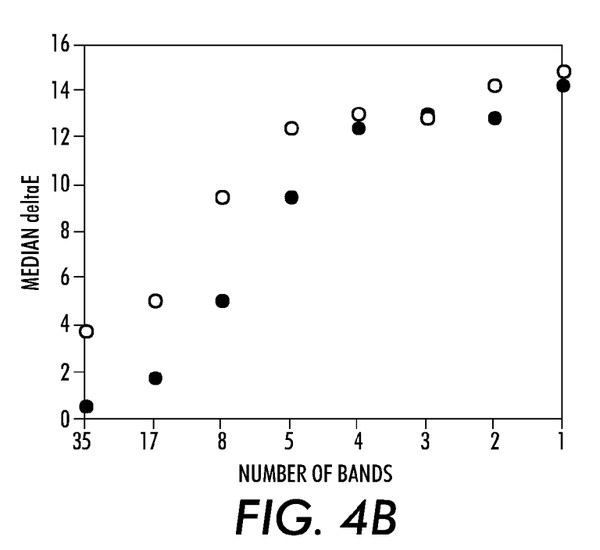
Figure 5A:
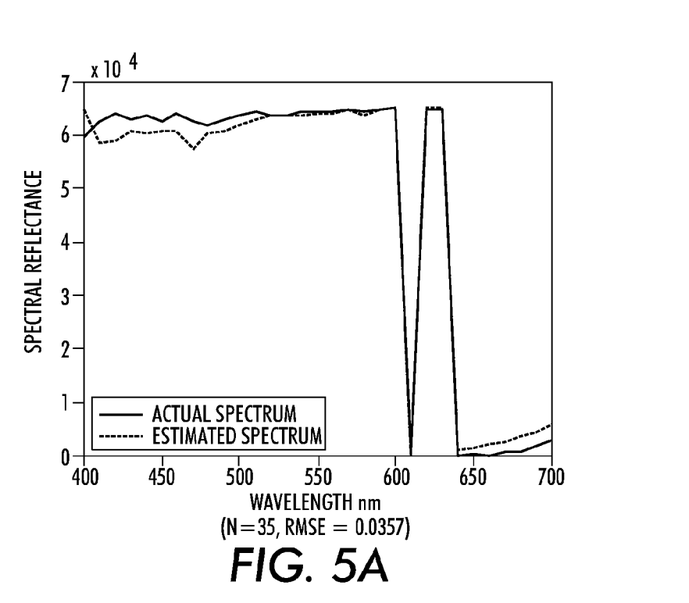
FIGS. 5A-B shows for one patch, the actual spectra and the estimates as well as the root mean square errors (RMSE) between them for the cases when N=35 and N=17.
Figure 5B:
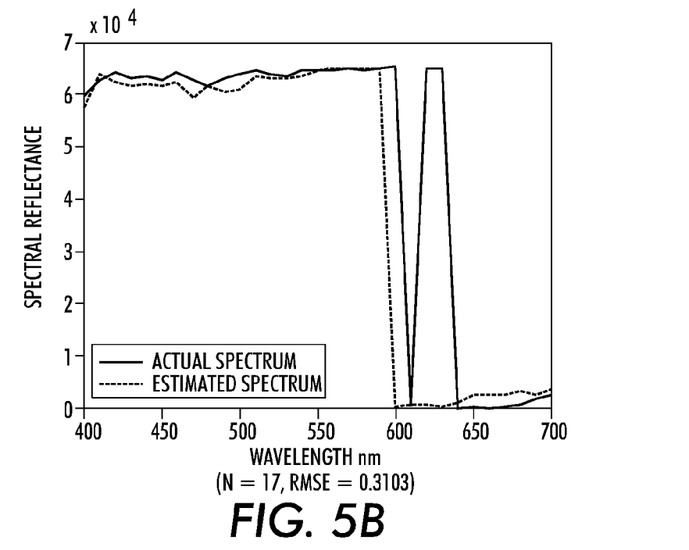
Figure 5C:
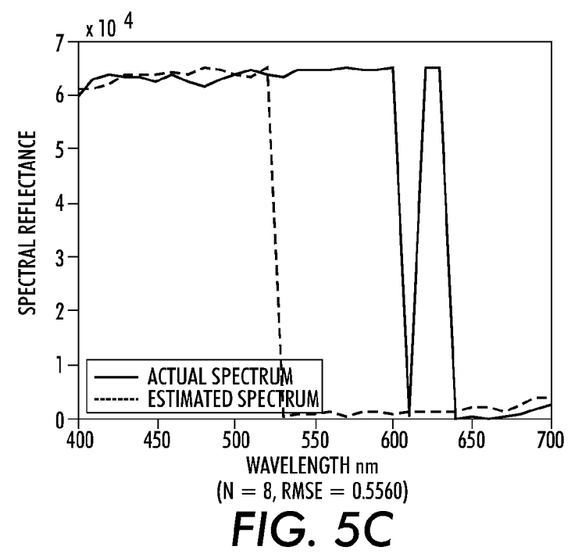
FIGS. 5C-D shows the actual and estimated spectra for the same patch as well as the RMSE between them for the cases when N=8 and N=1.
Figure 5D:
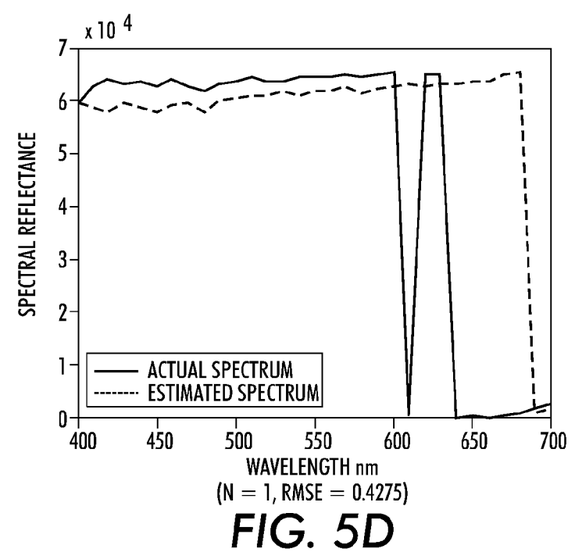

The measure to evaluate color estimation is the $\Delta E$ color difference metric, as is widely understood in the arts. FIGS. 4A-B shows the mean (4A) and median (4B) of the $\Delta E$'s taken between the actual and estimated Lab values over all 1000 samples for one IR set. These mean and median $\Delta E$'s were evaluated for each number of spectral bands: 35, 17, 8, 5, 4, 3, 2, 1, along with each of the corresponding 20 combinations. An examination of FIGS. 4A-B shows that the mean $\Delta E$ is the same over all the combinations, except for one case, within one number of spectral bands considered, while the median $\Delta E$ generally differs for only two of the 20 combinations within one number of spectral bands considered. These results are for one IR set. Similar results were obtained for the remaining eight IR sets.

The $\Delta E$'s for one patch between the Lab value corresponding to its actual spectrum and the Lab values corresponding to the estimated spectra in the visible wavelength range when N=35, 17, 8, 5, 4, 3, 2 and 1, were $\Delta E$=4.00, 14.03, 50.92, 50.92, 50.92, 39.12, 11.97 and 13.92, respectively. This confirms the results in FIG. 4, namely that when the number of spectral bands considered in the IR decreases, the estimated color patches are poorer as shown through the $\Delta E$ values. One exception is for the case of N=2, where the $\Delta E$ is lower than that in the case of N=1. However, the colors of the patches corresponding to the estimated spectra in both cases are not close to the color of the patch corresponding to the actual spectrum.

FIGS. 5A-D shows the spectra for the actual patch and the estimates as well as the root mean square errors (RMSE's) between them for the cases when N=35, 17, 8, and 1. As for the $\Delta E$, the RMSE generally increases with the decrease in the number of spectral bands taken in the IR wavelength range. Also note that when only one band in the IR is considered, the estimated spectra in the visible wavelength range are relatively flat.

Case 1(ii)—When the Spectral Bands are Determined Given a Set of Filters and Their Transmittance Spectra.

We consider the responses in the IR wavelength range of the spectra as compared with the actual reflectance values as in the previous case. The IR filters used are from Thor Labs. These filters are 28 in total and they have peak transmittances at the following wavelengths: 720 nm, 740 nm, 760 nm, 780 nm, 800 nm, 820 nm, 840 nm, 860 nm, 880 nm, 900 nm, 920 nm, 940 nm, 960 nm, 980 nm, 1000 nm, 1050 nm, 1100 nm, 1150 nm, 1200 nm, 1250 nm, 1300 nm, 1350 nm, 1400 nm, 1450 nm, 1500 nm, 1550 nm, 1600 nm and 1650 nm. From these 28 filters, we consider eight sets of 20 combinations each time. The number of filters and thus the IR responses considered for each of the eight sets are 24, 17, 8, 5, 4, 3, 2, and 1. Again, the combinations considered in the 17 band case were a subset of those considered in the 24 band case. The same selection applied to the other bands.

For each number of filters considered, the objective is to select, for each considered spectrum in the IR set, the spectrum in the visible-IR set with IR responses of minimum RMSE from the IR responses of the considered spectrum. The color portion of the selected spectrum is taken to be that of the considered spectrum in the IR set. The color part of the spectrum is then projected onto the sensor spectral sensitivity curves of a given camera to obtain the corresponding color values, such as RGB. In general, we conclude that the quality of color estimation decreases with the decrease of the number of responses considered in the IR wavelength range, as expected. The measure for color estimation used is the $\Delta E$ color difference metric. The search is summarized by the above-described Eq. (2).

Figure 6A:
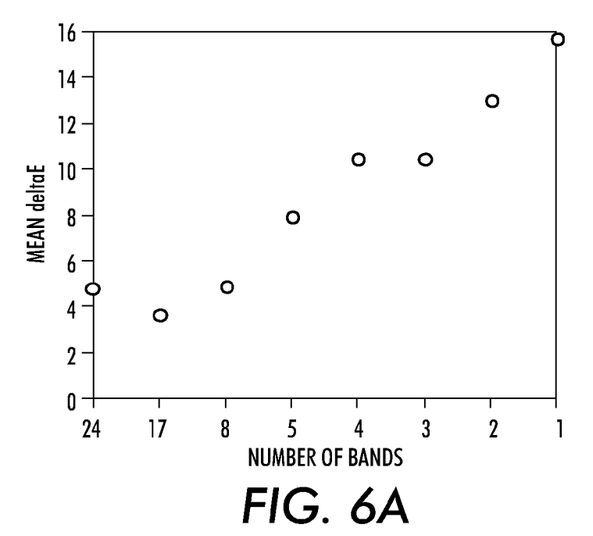
FIGS. 6A-B shows, for the filter case, the mean (FIG. 6A) and median (FIG. 6B) of the ΔE's taken between the actual and estimate Lab's over all 1000 samples for one IR set with the means and medians being evaluated for each number of spectral bands and each of the corresponding 20 combinations.
Figure 6B:
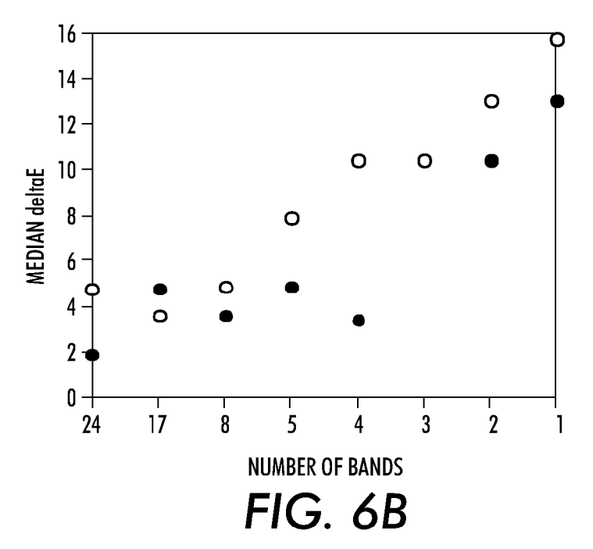

The mean and median $\Delta E$'s taken over all the samples for each of the 20 combinations as well as the number of bands corresponding to the filters considered are shown in FIGS. 6A-B. For one of the patches, the $\Delta E$'s between the Lab value corresponding to the actual spectrum and the Lab values corresponding to the spectral estimates for different numbers of spectral bands when 24, 17, 8, 5, 4, 3, 2 and 1, were $\Delta E$=4.00, 4.00, 21.66, 39.12, 65.38, 65.38, 61.71 and 28.77, respectively. This confirms the results, namely, that when the number of spectral bands considered in the IR decreases, the estimated color patches are generally poorer as shown through the $\Delta E$ values.

Example Special Purpose Computer

Figure 7:
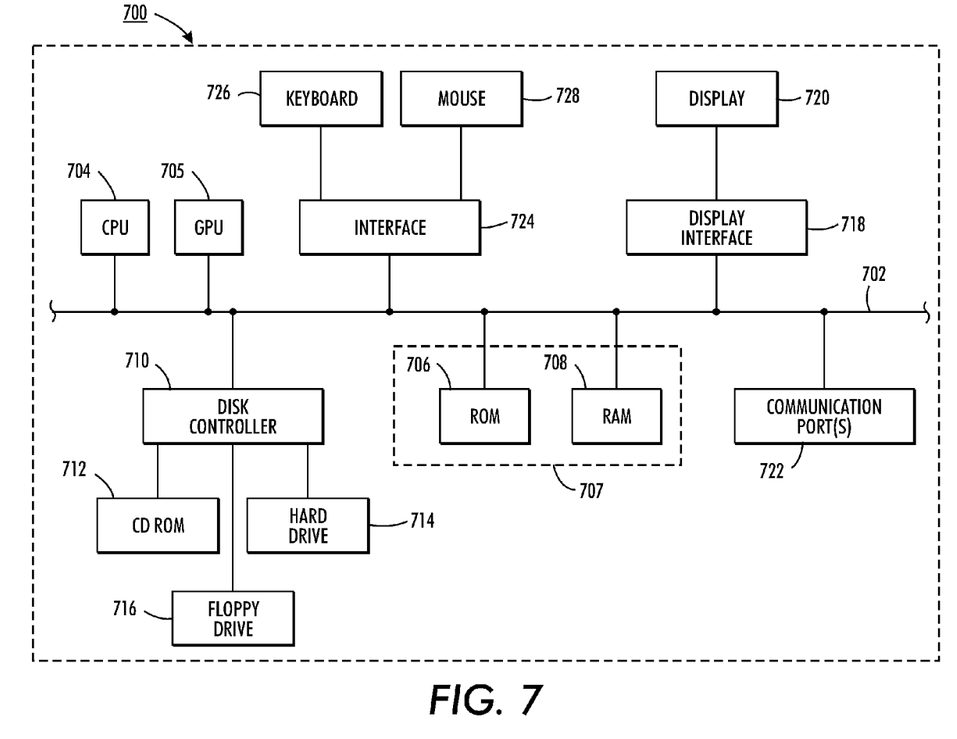
FIG. 7 illustrates a block diagram of one example special purpose computer for implementing one or more aspects of the present method as described with respect to the flow diagram of FIG. 1, and the block diagram of FIG. 2.

Reference is now being made to FIG. 7 which illustrates a block diagram of one example special purpose computer for implementing one or more aspects of the present method as described with respect to the flow diagram of FIG. 1, and the block diagram of FIG. 2. Such a special purpose processor is capable of executing machine executable program instructions and may comprise any of a micro-processor, microcontroller, ASIC, electronic circuit, or any combination thereof.

In FIG. 7, communications bus 702 is in communication with a central processing unit (CPU) 704 capable of executing machine readable program instructions for performing any of the calculations, comparisons, logical operations, and other program instructions for performing any of the steps described above with respect to the flow diagrams and illustrated embodiments hereof. Processor 704 is in communication with memory (ROM) 706 and memory (RAM) 708 which, collectively, constitute example storage devices. Such memory may be used to store machine readable program instructions and other program data and results to sufficiently carry out any of the functionality described herein. Disk controller 710 interfaces with one or more storage devices 714 which may comprise external memory, zip drives, flash memory, USB drives, or other devices such as CD-ROM drive 712 and floppy drive 716. Storage device stores machine executable program instructions for executing the methods hereof. Such storage devices may be used to implement a database wherein various records are stored. Display interface 718 effectuates the display of information on display 720 in various formats such as, for instance, audio, graphic, text, and the like. Interface 724 effectuates a communication via keyboard 726 and mouse 728, collectively via a graphical user interface. Such a graphical user interface is useful for a user to enter information about any of the displayed information in accordance with various embodiments hereof. Communication with external devices may occur using example communication port(s) 722. Such ports may be placed in communication with any of the example networks shown and described herein, such as the Internet or an intranet, either by direct (wired) link or wireless link. Example communication ports include modems, network cards such as an Ethernet card, routers, a PCMCIA slot and card, USB ports, and the like, capable of transferring data from one device to another. Software and data is transferred via the communication ports in the form of signals which may be any of digital, analog, electromagnetic, optical, infrared, or other signals capable of being transmitted and/or received by the communications interface. Such signals may be implemented using, for example, a wire, cable, fiber optic, phone line, cellular link, RF, or other signal transmission means presently known in the arts or which have been subsequently developed.

It will be appreciated that the above-disclosed and other features and functions, or alternatives thereof, may be desirably combined into many other different systems or applications. Various presently unforeseen or unanticipated alternatives, modifications, variations, or improvements therein may become apparent and/or subsequently made by those skilled in the art which are also intended to be encompassed by the following claims. Accordingly, the embodiments set forth above are considered to be illustrative and not limiting. Various changes to the above-described embodiments may be made without departing from the spirit and scope of the invention. The teachings hereof can be implemented in hardware or software using any known or later developed systems, structures, devices, and/or software by those skilled in the applicable art without undue experimentation from the functional description provided herein with a general knowledge of the relevant arts. Moreover, the methods hereof can be implemented as a routine embedded on a personal computer or as a resource residing on a server or workstation, such as a routine embedded in a plug-in, a driver, or the like. The methods provided herein can also be implemented by physical incorporation into an image processing or color management system. Furthermore, the teachings hereof may be partially or fully implemented in software using object or object-oriented software development environments that provide portable source code that can be used on a variety of computer, workstation, server, network, or other hardware platforms. One or more of the capabilities hereof can be emulated in a virtual environment as provided by an operating system, specialized programs or leverage off-the-shelf computer graphics software such as that in Windows, Java, or from a server or hardware accelerator or other image processing devices.

One or more aspects of the methods described herein are intended to be incorporated in an article of manufacture, including one or more computer program products, having computer usable or machine readable media. The article of manufacture may be included on at least one storage device readable by a machine architecture embodying executable program instructions capable of performing the methodology described herein. The article of manufacture may be included as part of a xerographic system, an operating system, a plug-in, or may be shipped, sold, leased, or otherwise provided separately either alone or as part of an add-on, update, upgrade, or product suite. It will be appreciated that various of the above-disclosed and other features and functions, or alternatives thereof, may be combined into other systems or applications.

Various presently unforeseen or unanticipated alternatives, modifications, variations, or improvements therein may become apparent and/or subsequently made by those skilled in the art which are also intended to be encompassed by the following claims. Accordingly, the embodiments set forth above are considered to be illustrative and not limiting. Various changes to the above-described embodiments may be made without departing from the spirit and scope of the invention. The teachings of any printed publications including patents and patent applications, are each separately hereby incorporated by reference in their entirety.

What is claimed is:

1. A method for estimating a visible vector representation for pixels in an infrared image, the method comprising:
   receiving an infrared (IR) image captured using a N-band infrared imaging system, said IR image comprising a plurality of pixels with each pixel having an IR band vector of N intensity values collected for that pixel; and
   for each pixel of interest in said infrared image:
   using a search metric to search a spectra database of vector samples to identify a visible-IR set with intensity values closest to this pixel's IR band vector, where said visible-IR sets and said intensity values in the IR band are narrowband spectra, said search metric comprising:
   where N is the number of spectral bands of said imaging system, $N_{cIR}$ is the number of samples in said visible-IR set, $S_{IR}^{x_{cIR}}(\lambda_i)$ is the IR reflectance of sample $x_{cIR}$ from the visible-IR set at wavelength $\lambda_i$, and $S_{IR}^{x_{IR}}(\lambda_i)$ is the IR reflectance of sample $x_{IR}$ from the IR set at wavelength $\lambda_i$, with a visible portion of $x_{cIR}$ being assigned to sample $x_{IR}$; and
   estimating a visible vector representation for said pixel based upon the visible portion corresponding to said closest visible-IR vector.

2. The method of claim 1, wherein said N-band infrared imaging system comprises any of: a multi-spectral camera, and a hyperspectral camera.

3. The method of claim 1, wherein said database of vector samples comprises a plurality of visible-IR sets and IR sets, each of said visible-IR sets comprising a visible portion with an associated vector of a spectrum discretized into wavelength intervals in the visible range, and an IR portion with an associated vector of a spectrum discretized into wavelength intervals in the infrared range.

4. The method of claim 1, further comprising:
   integrating said pixel's estimated visible vector representation with a set of three spectral sensitivity curves with peak sensitivities in the long, medium and short wavelength ranges, respectively, to obtain corresponding color values; and
   constructing at least a portion of a new color image using each of said pixel's respective color values.

5. The method of claim 1, wherein said N-band infrared imaging system used for capturing said N-band image comprises any of: a pulsed illuminator source and a continuous illuminator source, both illuminating in the entire infrared wavelength band of interest.

6. The method of claim 1, wherein said database is determined apriori with a representative material set with respect to an environment wherein said image was likely captured.

7. The method of claim 1, further comprising computing color coordinates from said visible vector representation.

8. A system for estimating a visible vector representation for pixels in an infrared image, the system comprising:
   a N-band infrared imaging system comprising any of: a multi-spectral camera, and a hyperspectral camera, said imaging system capturing an infrared (IR) image comprising a plurality of pixels, each pixel in said image having an associated IR band vector of N intensity values collected for that pixel;
   a database of vector samples comprising visible-IR sets and IR sets, each of said visible-IR sets comprising a visible portion with an associated vector of a spectrum discretized into wavelength intervals in the visible range, an IR portion with an associated vector of a spectrum discretized into wavelength intervals in the IR, and each of said IR sets comprising a vector of spectra discretized into wavelength intervals in the IR range and
   a processor in communication with said imaging system and a memory, said processor executing machine readable instructions for performing:
      for each pixel of interest in said infrared image:
         using a search metric to search said database to identify a visible-IR set with intensity values closest to this pixel's IR band vector, where said visible-IR sets and said pixel intensity values in the IR band are narrowband spectra, said search metric comprising:
         where N is the number of spectral bands of said imaging system, $N_{cIR}$ is the number of samples in said visible-IR set, $S_{IR}^{x_{cIR}}(\lambda_i)$ is the IR reflectance of sample $x_{cIR}$ from the visible-IR set at wavelength $\lambda_i$, and $S_{IR}^{x_{IR}}(\lambda_i)$ is the IR reflectance of sample $x_{IR}$ from the IR set at wavelength $\lambda_i$, with a visible portion of $x_{cIR}$ being assigned to sample $x_{IR}$;
            estimating a visible vector representation for said pixel based upon the visible portion corresponding to said closest visible-IR vector; and
            computing color coordinates for said pixel using said estimated visible vector representation.

9. The system of claim 8, wherein said database is determined apriori with a representative material set with respect to an environment wherein said image was likely captured.

10. The system of claim 8, further comprising:
    integrating said pixel's estimated visible vector representation with a set of three spectral sensitivity curves with peak sensitivities in the long, medium and short wavelength ranges, respectively, to obtain corresponding color values; and
    constructing at least a portion of a new color image using each of said pixel's respective color values.

11. The system of claim 8, wherein said N-band infrared imaging system used for capturing said N-band image comprises any of: a pulsed illuminator source and a continuous illuminator source, both illuminating in the entire infrared wavelength band of interest.

12. The system of claim 8, further comprising computing color coordinates from said visible vector representation.

13. A method for estimating a visible vector representation for pixels in an infrared image, the method comprising:
    receiving an infrared (IR) image captured using a N-band infrared imaging system, said IR image comprising a plurality of pixels with each pixel having an IR band vector of N intensity values collected for that pixel; and
    for each pixel of interest in said infrared image:
       using a search metric to search a spectra database of vector samples to identify a visible-IR set with intensity values closest to this pixel's IR band vector, wherein said IR portions of said visible-IR sets and said IR sets are spectral responses obtained for a set of IR filters with known spectral transmittances, said search metric comprising:

$$x_{cIR} = \mathrm{argmin}_{cIR=1,\ldots,N_{cIR}} \sqrt{\frac{\sum_{i=1}^{N}(P_{IR_i}^{x_{cIR}} - P_{IR_i}^{x_{IR}})^2}{N}}$$

where N is a number of bands corresponding to said set of IR filters, $N_{cIR}$ is a number of samples in said visible-IR set, $P_{IR_i}^{x_{cIR}}$ is the IR response corresponding to the $i^{th}$ filter of sample x from said visible-IR set; and
       estimating a visible vector representation for said pixel based upon the visible portion corresponding to said closest visible-IR vector.

14. The method of claim 13, wherein said N-band infrared imaging system comprises any of: a multi-spectral camera, and a hyperspectral camera.

15. The method of claim 13, wherein said database of vector samples comprises a plurality of visible-IR sets and IR sets, each of said visible-IR sets comprising a visible portion with an associated vector of a spectrum discretized into wavelength intervals in the visible range, and an IR portion with an associated vector of a spectrum discretized into wavelength intervals in the infrared range.

16. The method of claim 13, wherein the IR response corresponding to the $i^{th}$ filter of sample x from said visible-IR set comprises:

$$P_{IR_i}^{x_{cIR}} = \sum_{\lambda=1}^{M} T_{IR_i}(\lambda) S_{IR}^{x_{IR}}(\lambda) E(\lambda)$$

where i is an index in said set of IR filters, $T_{IR_i}(\lambda)$ is the transmittance spectrum corresponding to an $i^{th}$ filter, said transmittance spectrum being characteristic of said filter and independent of sample x, $P_{IR_i}^{x_{IR}}$ is the IR response corresponding to the $i^{th}$ filter of sample x and computed in a same manner as $P_{IR_i}^{x_{cIR}}$, M is the dimension of the spectrum in the IR wavelength range, and $E(\lambda)$ is the illuminant spectrum.

17. The method of claim 13, further comprising:

integrating said pixel's estimated visible vector representation with a set of three spectral sensitivity curves with peak sensitivities in the long, medium and short wavelength ranges, respectively, to obtain corresponding color values; and constructing at least a portion of a new color image using each of said pixel's respective color values.

18. The method of claim 13, wherein said N-band infrared imaging system used for capturing said N-band image comprises any of: a pulsed illuminator source and a continuous illuminator source, both illuminating in the entire infrared wavelength band of interest.

19. A system for estimating a visible vector representation for pixels in an infrared image, the system comprising:

a N-band infrared imaging system comprising any of: a multi-spectral camera, and a hyperspectral camera, said imaging system capturing an infrared (IR) image comprising a plurality of pixels, each pixel in said image having an associated IR band vector of N intensity values collected for that pixel;

a database of vector samples comprising visible-IR sets and IR sets, each of said visible-IR sets comprising a visible portion with an associated vector of a spectrum discretized into wavelength intervals in the visible range, an IR portion with an associated vector of a spectrum discretized into wavelength intervals in the IR, and each of said IR sets comprising a vector of spectra discretized into wavelength intervals in the IR range and a processor in communication with said imaging system and a memory, said processor executing machine readable instructions for performing:

for each pixel of interest in said infrared image:

using a search metric to search said database to identify a visible-IR set with intensity values closest to this pixel's IR band vector, wherein said IR portions of said visible-IR sets and said IR sets are spectral responses obtained for a set of IR filters with known spectral transmittances, said search metric comprising:

$$x_{cIR} = \operatorname{argmin}_{cIR=1,\ldots,N_{cIR}} \sqrt{\frac{\sum_{i=1}^{N}(P_{IR_i}^{x_{cIR}} - P_{IR_i}^{x_{IR}})^2}{N}}$$

where N is a number of bands corresponding to said set of IR filters, $N_{cIR}$ is a number of samples in said visible-IR set, $P_{IR_i}^{x_{cIR}}$ is the IR response corresponding to the $i^{th}$ filter of sample x from said visible-IR set;

estimating a visible vector representation for said pixel based upon the visible portion corresponding to said closest visible-IR vector; and computing color coordinates for said pixel using said estimated visible vector representation.

20. The system of claim 19, wherein said database is determined apriori with a representative material set with respect to an environment wherein said image was likely captured.

21. The system of claim 19, wherein said IR response corresponding to the $i^{th}$ filter of sample x from said visible-IR set as given by:

$$P_{IR_i}^{x_{cIR}} = \sum_{\lambda=1}^{M} T_{IR_i}(\lambda) S_{IR}^{x_{IR}}(\lambda) E(\lambda)$$

where i is an index in said set of IR filters, $T_{IR_i}(\lambda)$ is the transmittance spectrum corresponding to an $i^{th}$ filter, said transmittance spectrum being characteristic of said filter and independent of sample x, $P_{IR_i}^{x_{IR}}$ is the IR response corresponding to the $i^{th}$ filter of sample x and computed in a same manner as $P_{IR_i}^{x_{cIR}}$, M is the dimension of the spectrum in the IR wavelength range, and $E(\lambda)$ is the illuminant spectrum.

22. The system of claim 19, further comprising:

integrating said pixel's estimated visible vector representation with a set of three spectral sensitivity curves with peak sensitivities in the long, medium and short wavelength ranges, respectively, to obtain corresponding color values; and constructing at least a portion of a new color image using each of said pixel's respective color values.

23. The system of claim 19, wherein said N-band infrared imaging system used for capturing said N-band image comprises any of: a pulsed illuminator source and a continuous illuminator source, both illuminating in the entire infrared wavelength band of interest.

* * * * *

UNITED STATES PATENT AND TRADEMARK OFFICE
CERTIFICATE OF CORRECTION

PATENT NO. : 8,810,658 B2  
APPLICATION NO. : 13/364835  
DATED : August 19, 2014  
INVENTOR(S) : Sandra Skaff et al.

It is certified that error appears in the above-identified patent and that said Letters Patent is hereby corrected as shown below:

In the Claims

Col. 10, lines 51-52 for Independent Claim 1:

Insert:

$$-- \quad x_{cIR} = arg\, min_{cIR=1,\ldots,N_{cIR}} \sqrt{\frac{\sum_{i=1}^{N}(P_{IR_i}^{x_{cIR}} - P_{IR_i}^{x_{IR}})^2}{N}} \quad --$$

after the word "comprising:"

Col. 11, lines 49-50 for Independent Claim 8:

Insert:

$$-- \quad x_{cIR} = arg\, min_{cIR=1,\ldots,N_{cIR}} \sqrt{\frac{\sum_{i=1}^{N}(P_{IR_i}^{x_{cIR}} - P_{IR_i}^{x_{IR}})^2}{N}} \quad --$$

after the word "comprising:"

Signed and Sealed this  
Thirtieth Day of December, 2014

Michelle K. Lee  
*Deputy Director of the United States Patent and Trademark Office*